US006282533B1

(12) United States Patent
Ramaswamy et al.

(10) Patent No.: US 6,282,533 B1
(45) Date of Patent: Aug. 28, 2001

(54) SYSTEM AND METHOD FOR PERFORMING I/O-EFFICIENT JOIN PROCESSING

(75) Inventors: Sridhar Ramaswamy, Scotch Plains; Torsten Suel, Springfield, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/164,041

(22) Filed: Sep. 30, 1998

(51) Int. Cl.[7] ................................................. G06F 17/30
(52) U.S. Cl. ..................... 707/2; 707/3; 707/4; 707/100
(58) Field of Search ............................ 707/1–5, 100–104

(56) References Cited

U.S. PATENT DOCUMENTS

| | | | |
|---|---|---|---|
| 5,724,573 | * 3/1998 | Agrawal et al. | 707/6 |
| 5,781,906 | * 7/1998 | Aggarwal et al. | 707/102 |
| 5,884,320 | * 3/1999 | Agrawal et al. | 707/104 |
| 5,953,722 | * 10/1999 | Lampert et al. | 707/100 |
| 5,978,794 | * 11/1999 | Agrawal et al. | 707/3 |
| 5,987,468 | * 11/1999 | Singh et al. | 707/100 |
| 6,014,614 | * 1/2000 | Herring et al. | 702/196 |
| 6,072,495 | * 6/2000 | Watanabe et al. | 345/419 |

OTHER PUBLICATIONS

Edelsbrunner, H. "A New Approach to Rectangle Intersections Part I", International Journal of Computer Mathematics, vol. 13, 1983. pp. 209–219.*

Edelsbrunner, H., and M.H. Overmars, "Batched Dynamic Solutions to Decomposable Search Problems", Journal of Algorithms, vol. 6, No. 4, Dec. 1985. pp. 515–542.*

Aggarwal, Alok, and Jeffrey Scott Vitter, "The Input/Output Complexity of Sorting and Related Problems", Communications of the ACM, vol. 31, No. 9, Sep. 1988, pp. 1116–1127.*

Goodrich, M.T., J–J Tsay, D.E. Vengroff and J.S. Vitter. "External–Memory Computational Geometry", Proceedings of the 34th Annual Symposium on Foundations of Computer Science, Nov. 3–5, 1993. pp. 714–723.*

Patel, J.M. and D.J. DeWitt. "Partition Based Spatial–Merge Join (Extended Version)", found at http://www.cs.wisc.edu/paradise/papers/extended.spjoin.ps.*

Arge, Lars, and Jeffrey Scott Vitter "Optimal Dynamic Interval Management in External Memory": Proc. of the 37th Annual Symposium on Foundations of Computer Science, pp. 560–569. 1996.*

Koudas, N. and K.C. Sevcik. "High Dimensional Similarity Joins: Algorithms and Performance Evaluation", Proceedings of the 14th International Conference on Data Engineering, Feb. 23–27, 1998. pp. 466–475.*

Gaede, Volker, and Oliver Gunther, "Multidimensional Access Methods", ACM Computing Surveys, vol. 30, No. 2, Jun. 1998, pp. 170–231.*

Arge, Lars et al. "Theory and Practice of I/O Efficient Algorithms for Multidimensional Batched Searching Problems": Proc. of the 9th Annual ACM–SIAM Symposium on Discrete Algorithms, pp. 685–694. Jan. 17–19, 1999.*

* cited by examiner

Primary Examiner—Jean R. Homere
Assistant Examiner—Luke S Wassum
(74) Attorney, Agent, or Firm—Gibbons, Del Deo, Dolan, Griffinger & Vecchione

(57) ABSTRACT

I/O-efficient methods and apparatus are provided for the d-dimensional join problem in one, two, and three dimensions, and are also generalized for arbitrary higher dimensions. Let N be the total number of rectangles in the two sets to be joined, M the total amount of memory available, B the disk block size, and T the total number of pairs in the output of the join. Define n=N/B, m=M/B, and t=T/B. For one and two dimensions, I/O-optimal join methods are provided that run in $O(n\log_m n+t)$ I/O operations and have utility to temporal and spatial database systems. For dimensions $d \geq 3$, methods are provided that run in $O(n\log_m^{(d-1)} n+t)$ I/O operations, which is within a $\log_m^{(d-2)} n$ factor of the currently known lower bounds.

23 Claims, 8 Drawing Sheets

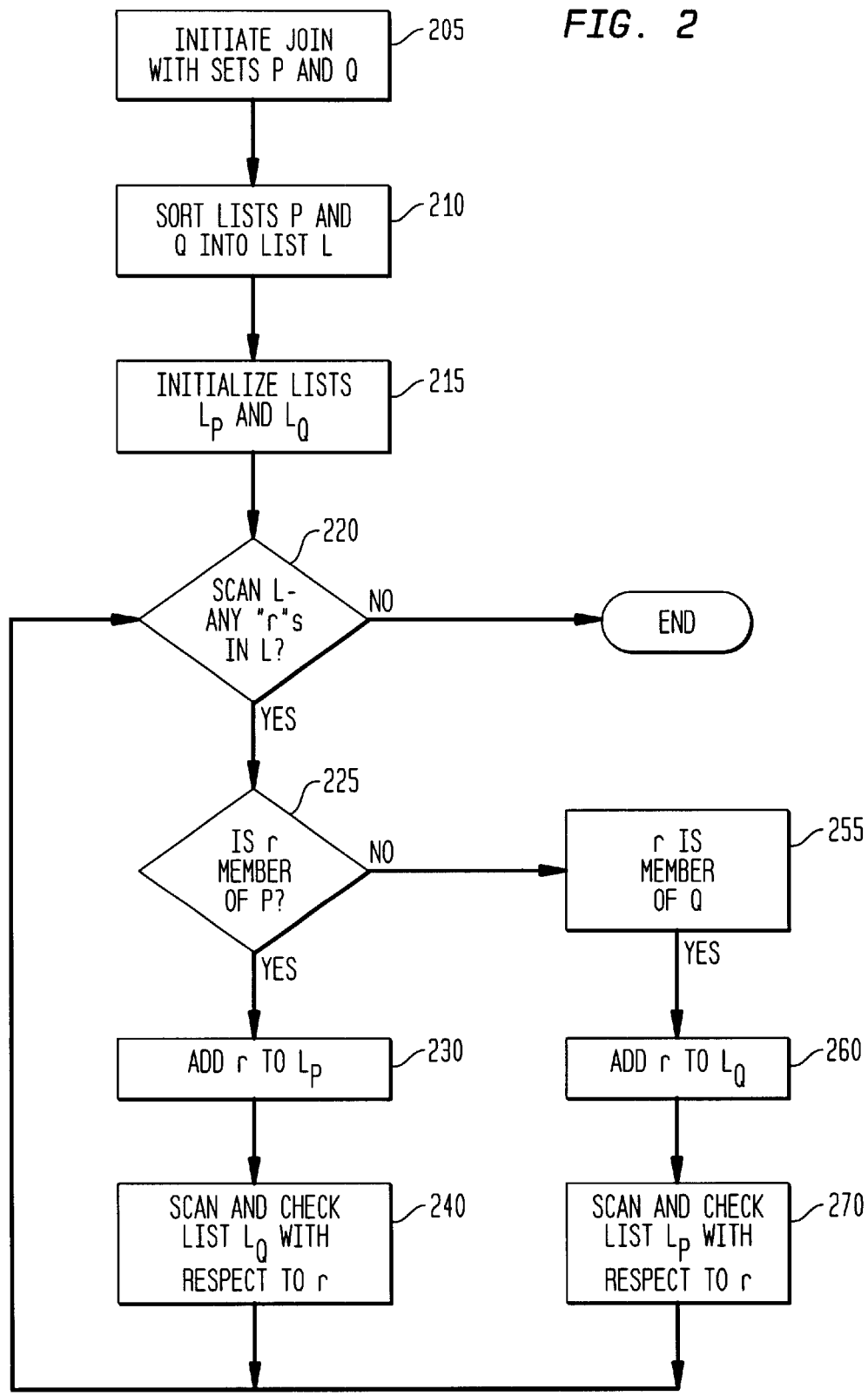

SYSTEM AND METHOD FOR PERFORMING I/O-EFFICIENT JOIN PROCESSING

CROSS REFERENCES TO RELATED APPLICATIONS

This application is related to another U.S. patent application Ser. No. 09/163,939, now abandoned, and entitled "SYSTEM AND METHOD FOR PERFORMING I/O-EFFICIENT BATCHED SEARCHING" having common inventors and a common assignee and U.S. patent application Ser. No. 09/163,943, pending, and entitled "SYSTEM AND METHOD FOR PERFORMING SCALABLE SWEEP BASED SPATIAL JOIN" having common inventors and a common assignee, both incorporated by reference herein.

FIELD OF THE INVENTION

The present invention is directed towards I/O-efficient join processing and in particular, towards join operations in temporal, spatial and constraint databases.

BACKGROUND OF THE INVENTION

Input and output (I/O) limitations can be a critical aspect in achieving acceptable system performance in many large scale applications such as those arising in VLSI and CAD design, spatial databases and geographic information systems. Even though CPU speeds have, over the past decade or so, increased at an annual rate of 40–60%, disk transfer rates have only increased 7–10% annually. Increases in internal memory sizes have not been enough to keep pace with these large applications which generate enormous amounts of data.

Data will, therefore, not always fit in internal memory. Secondary or external memory is therefore needed to accommodate the large blocks of produced data. The successful realization of any data model in a large-scale database requires supporting its language features with efficient secondary-storage manipulation. Along with retrieval, the join is one of the most I/O-intensive operations in database systems. As the join operation is also one of the fundamental relational database query operations, a considerable amount of research has been undertaken in an attempt to develop I/O efficient join techniques in the relational database model.

The join operation facilitates the retrieval of information from two different sets based on the Cartesian product of the two sets. Specifically, the join operation is used to combine tuples (rows of information) from two or more sets based on common information. Efficient implementation of the join operation is difficult since no predefined links between the sets are required to exist.

In this context, the standard measure of efficiency for a join operation is the number of I/O operations performed by the technique in question. Moreover, it is important to develop techniques that have provably good worst-case bounds and that are also efficient in practice. The most efficient technique has a lower bound of $\Omega(n \log_m n+t)$ I/O operations or running time. This is implied by the well-known lower bound for sorting in external memory, where B is the units of data per disk block, M is the total amount of main memory, N is the units of data in the problem, T is the units of data in the solution, n=N/B, t=T/B, m=M/B and $$\log_m n = \max\left(1, \frac{\log n}{\log m}\right).$$

See A. Aggarwal & J. S. Vitter, "The I/O log m Complexity of Sorting and Related Problems," Communications of the ACM 31(9) (1988), pps. 1116–1127.

The general data structure problem in many data models is the storage and manipulation of d-dimensional rectangles. The term rectangle is used in a general sense to denote intervals in one dimension, rectangles in two dimensions and hyper-rectangles in d dimensions. It is also assumed that the sides of the rectangles are parallel to the coordinate axes. As such, indexing or retrieval in many data models reduces to d-dimensional range searching over d-dimensional rectangles. The join in many data models can be defined as the intersection between two sets of rectangles in d dimensions. Although other definitions of the join are possible, based on inequalities, dominance, or proximity, the intersection-based join problems are good representatives of join problems.

In one dimension, the join is simply the set of intersections between two sets of intervals. This problem is the prototypical join problem in temporal and constraint data models. The prior art techniques used to solve the interval join problem suffer various drawbacks.

On-line interval intersection occurs where a data structure is built on an input set of intervals and then queried (or updated) in an on-line fashion. That is, the results of a query have to be returned before the next query is processed. This problem has been extensively studied both in main memory and secondary storage. In particular, the open problem of whether it is possible to build a dynamic, worst-case optimal data structure for this problem was recently resolved. See L. Arge & J. S. Vitter, "Optimal Dynamic Interval Management in External Memory," IEEE Symp. on Foundations of Comp. Sci. (1996). However, directly applying the on-line intersection technique to the one-dimensional join problem results in a running time of $O(N \log_B n+t)$ I/O operations, which is a factor of $\Theta(B (\log m)/(\log B))$ away from the optimal.

Off-line interval intersection, where a stream of queries is submitted to a data structure which processes them in a "lazy" fashion, has also been studied. Directly applying the off-line data structure to the one-dimensional join problem results in a technique that is optimal with respect to the running time, but uses a non-optimal $O(n \log_m n)$ disk blocks of storage.

An asymptotically optimal (but somewhat impractical) method for the one-dimensional join problem can be obtained by using the reduction of interval intersection to two-dimensional range searching and by using the batch two-dimensional range query techniques. On the other hand, the approaches in the temporal database literature for interval join are based on heuristics and do not offer good asymptotic worst-case bounds.

In two dimensions, the join between two relations is the intersection between rectangles in the plane. This join problem has a very elegant solution in main memory that uses priority search trees and plane sweeping to achieve an optimal running time. In secondary storage, this problem can be solved in an asymptotically optimal way by reduction to the problems of line segment intersection and batched range searching. This solution, however, in practice will be much more inefficient than that of the methodology of the invention as described below.

The general problem of finding intersections between two sets of d-dimensional hyper-rectangles has also been studied. Specifically, the prior art techniques focus on efficient internal-memory methods for reporting intersections between rectangles in d-dimensional space. The fastest currently known internal-memory method runs in $O(N\log_2^{(d-1)} N+T)$ time and linear space, and several earlier results exhibited some additional logarithmic factors in time as well as in space.

SUMMARY OF THE INVENTION

The invention provides I/O-efficient methods for the d-dimensional rectangle-join problem in one, two, three and arbitrary higher dimensions. The methods enable I/O-efficient processing for join problems in temporal, spatial, and constraint databases. Importantly, for one and two dimensions, the present invention methods are I/O-optimal.

Advantageously, a relatively simple and elegant optimal method is provided for the one-dimensional join problem. In an exemplary embodiment of the one-dimensional join method, after an initial sort of the two input relations, the method uses a single scan of the sorted relations, in which it maintains two simple list structures called I/O-lists, to produce the output. Importantly, the method outputs all intersections only once. This method is very amenable to optimizations that further reduce the number of I/O operations needed, thus making it an ideal candidate for practical use.

Additionally, an optimal solution for the two-dimensional join problem is provided, based on the above I/O-list structure together with distribution-sort and distribution-sweep techniques. Specifically, by adjusting the fan-out of the recursion with respect to the number of I/O-lists that have to be maintained, a method is obtained with asymptotically optimal worst-case behavior, fairly small constants, and opportunities for further optimizations for practical use.

Importantly, a d-dimensional join method is provided by using distribution sweeping on one axis to reduce a d-dimensional join of size N to a slight generalization of a (d−1)-dimensional join of size N, and a set of smaller problems in d-dimensions that can then be solved recursively. Using the above methodology, a three-dimensional join method is provided that performs $O(n\log_m^2 n+t)$ I/O operations. The technique is optimal for $t=\Omega(n\log_m^2 n)$, and a small factor of $\log_m n$ away from the lower bound. More generally, in $d \geq 2$ dimensions the number of I/O operations is $O(n \log_m^{(d-1)} n+t)$, which is at most a factor of $\log_m^{(d-2)} n$ away from the best currently known lower bound. In addition, the algorithm uses only linear space.

BRIEF DESCRIPTION OF THE DRAWINGS

A more complete understanding of the present invention may be obtained from consideration of the following description in conjunction with the drawings in which:

FIG. 2 is a functional flowchart of a one-dimensional join processed in accordance with the method of the present invention;

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 1 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

For sake of clarity, the detailed description is separated by section headers. Specifically, the first section presents an exemplary system for employing the present invention and the manner in which I/O efficiency is measured in the present invention. Sections two through four present solutions according to the method of the invention for the one-dimensional join problem, the optimal solution for the two-dimensional join problem and the solution for three-dimensional join problem. Section five generalizes the solution to arbitrary dimensions.

1. System and Efficiency Measurements

Figure 1A:
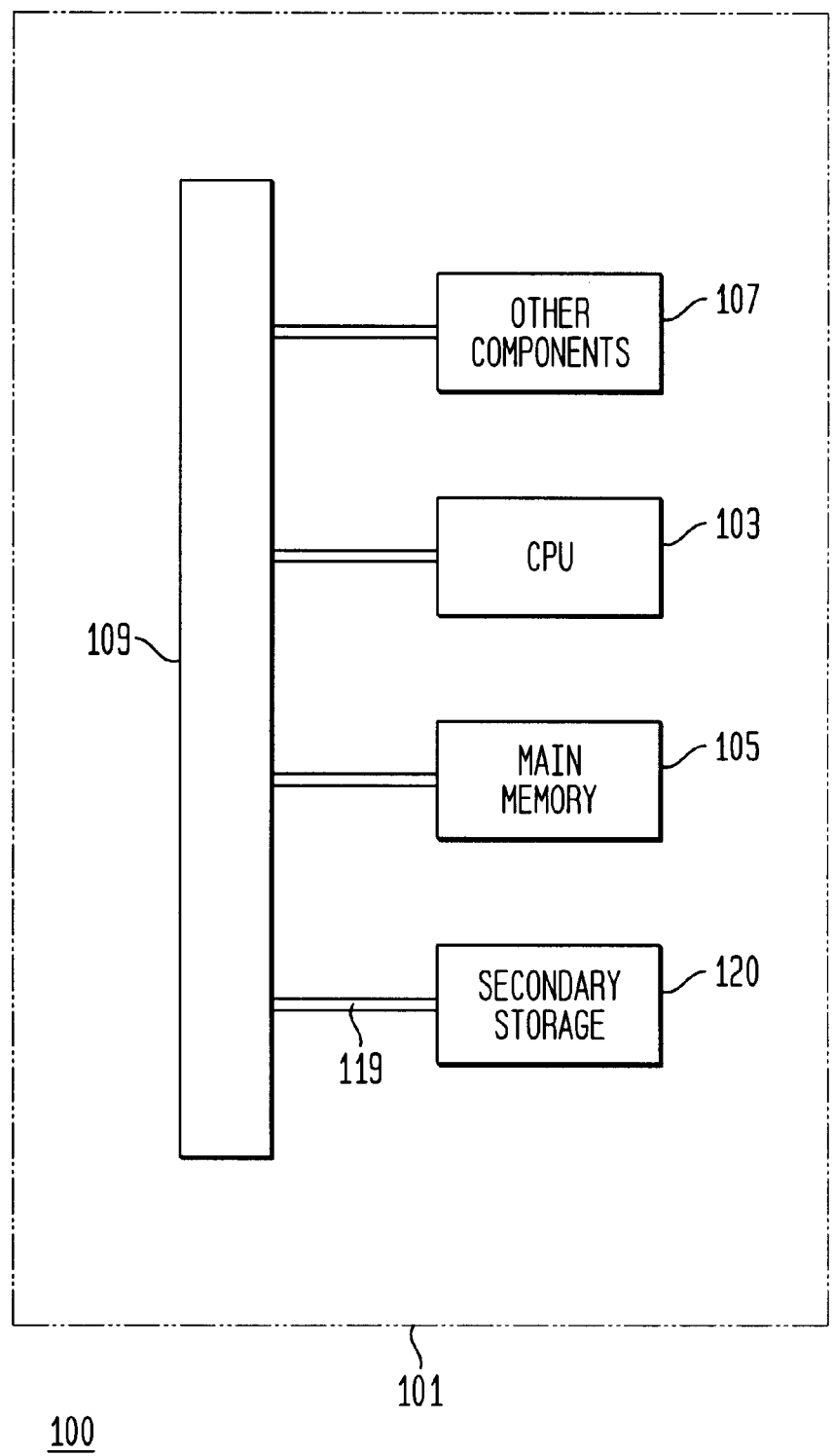
FIGS. 1a and 1b are block diagrams of exemplary data processing devices for performing I/O-efficient join operations.

FIG. 1a illustrates an exemplary embodiment of a system 100 which can be used in conjunction with the methodology of the invention. System 100 has a computer 101 that includes a central processing unit (CPU) 103, a main memory 105, a secondary storage unit 120 connected to a databus 109 by means of an input/output bus (I/O bus) 119, and other components 107 (including but not limited to math coprocessors, video display units, keyboards, mice, networking hardware) needed to operate computer 101. Databus 109, which connects the aforementioned components together, can be any physical conduit for data to be transferred from one component to the other and can consist of multiple databuses that are interlinked with each other.

CPU 103 is a general purpose computer capable of executing a stored program routine that implements the I/O-efficient join methodology described herein and shown in FIGS. 2 through 7. Main memory 105 might consist of a single memory chip or multiple banks of memory and includes Read Only Memory (ROM) and Random Access Memory (RAM). Secondary storage unit 120 is capable of storing and transmitting data and can consist of multiple secondary storage units that are linked together. Input data is stored in the secondary storage units 120 and is transmitted to CPU 103 through I/O bus 119 and data bus 109. I/O bus 119 can also consist of multiple physical conduits that are linked together. Secondary storage system 120 can consist of mass storage devices like magnetic disks, optical disk drives, or any other type of storage medium capable of staring large amounts of data and capable of providing random access to the data.

Secondary storage units 120 store the input data and the output results produced by the methodology of the invention. For example, the I/O-efficient join methodology of the invention determines intersections (output results) between d-dimensional rectangle data sets (input data). In addition, secondary storage units 120 are also used to store the temporary results that the methodology produces. The temporary results can also be kept in main memory 105 and are moved to secondary storage 120 only if there is not enough main memory 105 to store them.

The inventive methodology will be described in the context of an embodiment where the amount of data is too large to fit in main memory 105. In this situation, the methodology provides cost savings in the number of input-output (I/O) operations (from secondary storage 120 to CPU 103 and main memory 105) that need to be performed. For the problems considered herein, the main bottleneck is the number of I/O operations to be performed. Hence, the methodology provides considerable cost savings and an overall decrease in running times as compared to other techniques.

Figure 1B:
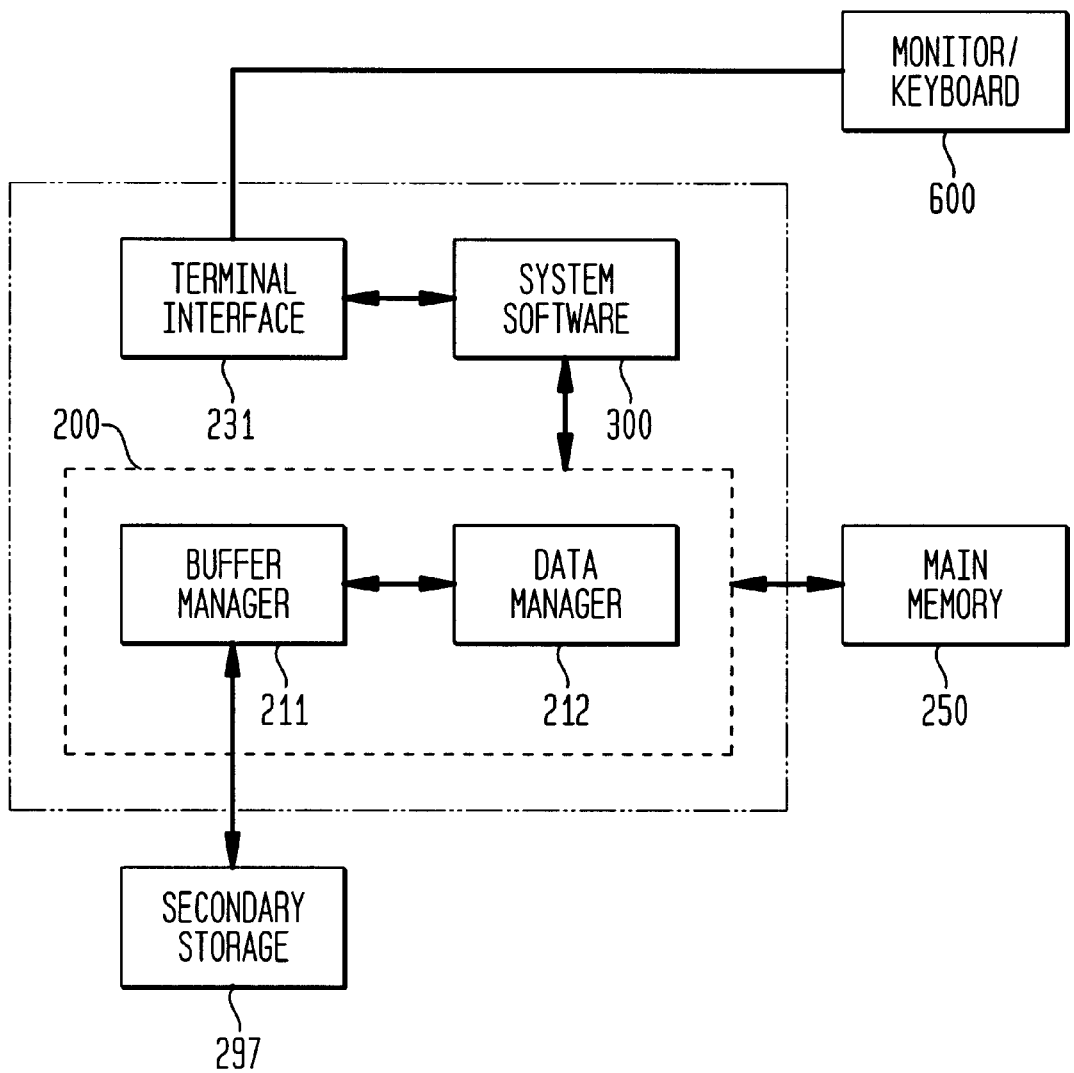

FIG. 1b is an exemplary architecture that can be used to implement the methodology of the invention. It can readily recognized that the invention has application to any database management system (DBMS) or any other system that needs to process instances of the problems described herein. A computer 201 consists of a system software module 300 (which could implement an operating system like Sun Solaris, Windows NT, etc.). This module communicates with the user(s) by means of a terminal interface module 231, which is connected to a keyboard and a monitor 600. Alternately, there could be many users connected to the computer by means of multiple keyboards and monitors.

Computer instructions for carrying out the methodology of the invention reside in system module 200, which consists of a data manager module 212 for implementing the methodology as described herein and a buffer manager module 211 for deciding which data is kept in main memory 250. The input, output and intermediate data is stored on secondary storage 297 and the memory resident portion is kept in main memory 250. Those skilled in the art will recognize, however, that alternate architectures can be used to implement the techniques described in this paper. Those skilled in the art will also recognize that the methodology and architecture of the invention can be used by database systems (including relational database systems (RDBMS), geographical information systems (GISs) and object-relational database systems (ORDBMS)) and other systems (including scientific applications) which involve data operations of a similar nature to those of the described embodiments of the invention.

The efficiency of the methodology is measured in terms of the number of I/O operations each method performs. Moreover, the methods must have provably good worst-case bounds, and also be efficient in practice. The standard assumption is made that each access to secondary memory 120 from computer 101 transmits one disk block with B units of data. This is counted as one I/O operation. The total amount of storage in primary memory 105 (or main memory) is denoted by M. Given two sets $P=\{p_i | i \in [N_1]\}$ and $Q=\{q_i | i \in [N_2]\}$ of d-dimensional rectangles, where $[v]$ denotes the set $\{0, 1, \ldots, v-1\}$, the d-dimensional join between P and Q, denoted by $P \triangleright\triangleleft Q$, is the set of all pairs (p, q) with $p \in P$ and $q \in Q$ such that p and q have a non-empty intersection. The total number of pairs in $P \triangleright\triangleleft Q$ is denoted by T. For sake of convenience, we denote $$N = N_1 + N_2, n = N/B, t = T/B, m = M/B \text{ and}$$

$$\log_m n = \max\left(1, \frac{\log n}{\log m}\right).$$

2. Joins in One Dimension

As stated above, the one-dimensional join is the set of intersections between two sets of intervals and is simply refereed to as the interval join problem. After an initial sort of the two input relations, the present invention uses a single scan of the sorted relations, in which it maintains two simple list structures called I/O-lists, to produce the output. The method is relatively simple, and has significant utility for join processing in temporal databases. As shown below, the one-dimensional method is used as a building block for constructing the higher dimensional joins.

Recall that in the one-dimensional join problem, there are two sets $P=\{p_i \in [N_1]\}$ and $Q=\{q_i \in [N_2]\}$ of intervals, and each interval $r \in P$ or $r \in Q$ is defined by a lower boundary $r_{min}$ and an upper boundary $r_{max}$. The problem is to report all intersections between an interval in P and an interval in Q. At the beginning of the method, it is assumed that P and Q have already been sorted by their lower boundaries into one list L of intervals. This pre-sort can be done in $O(n \log_m n)$ I/O operations using, say, the optimal sorting algorithm presented in A. Aggarwal & J. S. Vitter, "The I/O Complexity of Sorting and Related Problems," Communications of the ACM 31(9) (1988), 1116–1127, which is herein incorporated by reference. As shown with respect to FIGS. 2 and 2A, the methodology of the invention completes the interval join in an additional $O(n+t)$ I/O operations.

Specifically, a user requests a database query for a join operation on sets P and Q (step 205). Sets P and Q are sorted in order of increasing lower boundaries into a single list L (step 210). The method of the present invention then initializes two I/O-lists, one for set P and one for set Q, labeled $L_P$ and $L_Q$, respectively (step 215). The method then, for every interval r in L (step 220), determines if r is a member of set P (step 225) or a member of set Q step (255). For each interval r, the operations discussed in the next two paragraphs (steps 230–240 and 260–270, respectively) are then performed.

If r is a member of set P, then r is added to I/O-list $L_P$ (step 230). The operations of steps 240 and 270 are similar and for sake of clarity are discussed with respect to flowchart 290 of FIG. 2A. I/O list L is scanned (steps 291–292) to determine for each interval s in L, whether s intersects r (step 293–294). If there is such an intersection, then the intersection is outputted and interval s is kept in I/O-list L (step 295). If an intersection is not found, then interval s is deleted from I/O-list L (step 296). For steps 240 and 270, replace L with $L_Q$ and $L_P$, respectively.

In order to see that the present invention method correctly outputs all intersections exactly once, note that pairs $p \in P$ and $q \in Q$ that intersect can be classified into two cases: (i) p begins before q and (ii) q begins before p. (Coincident intervals are easily handled using a tie-breaking strategy.) Steps 225–240 report all intersections of an interval from P within currently "active" intervals from Q, thus handling case (ii), while steps 255–270 similarly handles case (i).

In order to establish the bound of O(n+t) I/O operations for the one-dimensional join method, it is necessary to know that the I/O-lists $L_P$ and $L_Q$ can be efficiently maintained in external memory. It is sufficient if only a single block of each list is kept in main memory 130. To add an interval to a list, add it to this block, and write the block out to disk whenever it becomes full. To scan the list for intersections, just read the entire list and write out again all intervals that are not deleted. This relatively simple implementation of a list is referred to as an I/O-list and is used in the methods discussed below for the higher dimensional joins.

To see that this method satisfies the claimed bound, note that each interval in L is added to an I/O-list only once, and that in each subsequent scan of an I/O-list, the interval is either permanently removed, or it produces an intersection with the interval that initiated the scan. Since all output is done in complete blocks, this results in at most n+t reads and n+t writes to maintain the lists $L_P$ and $L_Q$, plus another t writes to output the result, for a total of 2n+3t I/O operations. In sum, given a list of intervals from P and Q sorted by their lower boundaries, the interval join method generates all intersections between intervals from P and Q using O(n+t) I/O operations.

In temporal databases, objects can be associated with an interval (which corresponds to their "lifetime"), and also with a key value (which is the equivalent of the relational key value). Trying to join two such sets results in a problem where each interval is associated with a key value from another dimension, and where the problem is to find all intervals with matching key values that intersect. The present invention interval join method can be easily extended to solve this problem. This is achieved by sorting the intervals in L with respect to key values, where intervals with identical key values are also sorted by their left boundary. The above method is then run on each subset of intervals with identical key values.

Although in the exemplary embodiment described above, it is sufficient to keep only one block of each I/O-list in memory, in practice it may be preferable to try to maintain most or all of the lists in memory. For many realistic data sets this is possible even for fairly large input sizes, especially for the key-based temporal join. If this is not possible, then in an alternative embodiment, one relatively simple way of decreasing the I/O cost for maintaining the lists is to read in a large block of intervals and then scan $L_P$ and $L_Q$ only once for this block, thus reducing the total cost of the present invention one-dimensional join method close to n read and n+t writes.

3. The Two-Dimensional Case: Rectangle Join

As stated above, the join in two dimensions is the intersection between rectangles in the plane and is referred to as the rectangle join problem. The present invention method uses standard distribution sort and distribution-sweep techniques (see A. Aggarwal & J. S. Vitter, "The I/O Complexity of Sorting and Related Problems," Communications of the ACM 31(9) (1988), 1116–1127; H. Edelsbrunner, "A New Approach to Rectangle Intersections, Part I," Int. J. Computer Mathematics 13 (1983), 209–219; M. T. Goodrich J. -J. Tsay, D. E. Vengroff& J. S. Vitter, "External-Memory Computational Geometry," Proc. 34th Annual IEEE Symposium on Foundations of Computer Science (1993)) and the I/O-list structure developed above for the one-dimensional case.

Because the M.T. Goodrich et al publication referred to above contains essential material as defined by 35 U.S.C. 112 the portions deemed necessary to aid in understanding applicants invention are represented here verbatim from paragraphs 2 and 2.1 of that publication, and are set forth below in quotations. The footnote references in the quoted portion below can be found in the M.T. Goodrich publication.

2 Distribution Sweeping

The well-known plane sweep paradigm [30] is a powerful approach for developing computational geometry algorithms that are efficient in terms of internal computation. In this section we develop a new plane sweep approach that for the first time achieves optimal I/O performance (and a subsequent improvement in practice) for a large number of large-scale off-line problems in computational geometry.

A typical internal memory plane sweep algorithm proceeds by examining the geometric objects that make up its input (e.g., points, line segments, vertices of polygons, etc.) in sequence along a given dimension. As the scan proceeds, a dynamic data structure, typically a search tree, is maintained. Each time a new input object is processed, either an update, a query, or both are performed in the dynamic data structure. If each object results in only a constant number of updates and/or queries, each of which can be performed in time logarithmic in the number of objects, then the total running time of the algorithm is O((N+K) log N+T). For problems to which this technique is typically applied, this performance is optimal. An example of this is the standard plane sweep algorithm for orthogonal segment intersection, where the dynamic data structure is an interval tree [30].

An obvious way of implementing algorithms of this type in secondary memory is to replace the dynamic search tree with a dynamic B-tree [6,9]. Unfortunately, this requires $\Theta((N+K) \log_\mu V) = \Theta(B(V+K) \log_\mu V)$ I/O operations in the worst case, which is prohibitive. Previous work using lazy batched updates on the B-tree yielded algorithms with $O((V+N) \log_2 V)$ $I/O_s$ [34].

Our new method uses an off-line top-down implementation of the sweep, which is based upon a novel application of the subdivision technique used in the "distribution sort" algorithms of [3,27,37]. The central idea is that we divide the input into $O(\mu)$ strips, each containing an equal number of input objects. We then scan down these strips simultaneously, looking for components of the solution involving interactions between objects among different strips. Once we have done this, we are left with the problem of determining the components of the solution involving interactions completely within the strips, which we can solve recursively. Because we sweep the strips and then distribute the data to recursive subproblems for solution, we refer to our technique as distribution sweeping.

In Section 2.1 and 2.2 we discuss optimal distribution sweeping algorithms for orthogonal segment intersection and all nearest neighbors respectively. There are many other problems that this technique can be applied to. These are mentioned in Section 2.3 and discussed at length in the full version of this paper.

2.1 Orthogonal Segment Intersection Reporting

The orthogonal segment intersection problem is that of reporting all intersecting pairs from a set of N orthogonal line segments. This problem is important in graphics and VLSI design systems.

To solve this problem, we first use an optimal sorting algorithm, for example [27,37] to sort the endpoints of all segments into two lists, one sorted by x and the other by y. The list sorted by I is used to locate medians which we will use to split the input into $[\mu]$ vertical strips 7i. The list sorted by y is used to perform the sweep, which moves from top to bottom. Points encountered during the sweep are processed as follows:

If the top endpoint of a vertical segment is encountered, the segment is inserted into an active list Ai associated with the strip 7i in which the segment lies, and later, when the bottom endpoint is encountered, the segment is deleted from Ai If the endpoints of a horizontal segment R are encountered, we consider the strips that R passes completely through and report all the vertical segments in the active lists of those strips.

This process finds all intersections except those between vertical segments and horizontal segments or portions thereof that do not completely span vertical strips. These are found when the problem is solved recursively on each strip.

In constructing the recursive subproblems, R is only distributed to the two strips containing its endpoints, thus at each level of recursion each segment is represented only twice. This is the key to preventing the total size of the subproblems at a given level of recursion from exceeding the input size by more than a constant factor. Once the number of points in a recursive subproblem falls below M, we simply solve the problem in main memory.

Insertions and vertical segments can be processed efficiently using blocks. With the exception of deleting segments from active lists, the total number of I/Os performed by this method is optimal $O(v \log_\mu V+T)$, where r=T/B and T is the number of intersections reported. If "vigilant" deletion is used to delete each segment as soon as the sweep line reaches the bottom endpoint, a nonoptimal $O(N)=O(Bv)$ term is added to the I/O bound. Instead, we use the following "lazy" deletion approach: For each strip, we maintain Ai as a stack. When a new segment is inserted, we simply add it to the stack. We keep all but the B most recently added elements of this stack in blocks of size B in external memory. When we are asked to output the active list, we scan the entire stack, outputting the segments still current and removing the segments whose deletion time has passed. A simple amortization argument shows that this method achieves the bound of Theorem 1.1.

For the two-dimensional join problem, there are two sets $P=\{p_i|i\in[N]\}$ and $Q=\{q_i|i\in[N_2]\}$ of rectangles, and each rectangle r∈P or r∈Q is defined by a lower boundary $r_{min}^x$ and upper boundary $r_{max}^x$ in the x-axis, and by a lower boundary $r_{min}^y$ and upper boundary $r_{max}^y$ in the y-axis. The problem is to report all intersections between an interval in P and an interval in Q. As shown below, the method of the invention performs $O(n\log_m n+t)$ I/O operations. As will be apparent to those skilled in the art, this asymptotically matches the lower bound on I/O operations as described by Aggarwal, id.

Assume again that at the beginning of the two-dimensional method, P and Q have already been sorted by their lower boundaries in the x-axis into one list L of rectangles. This can be done in $O(n\log_m n)$ I/O operations. As shown with respect to FIGS. 3–5, the methodology of the invention completes the rectangle join in $O(n\log_m n+t)$ I/O operations.

Figure 5:
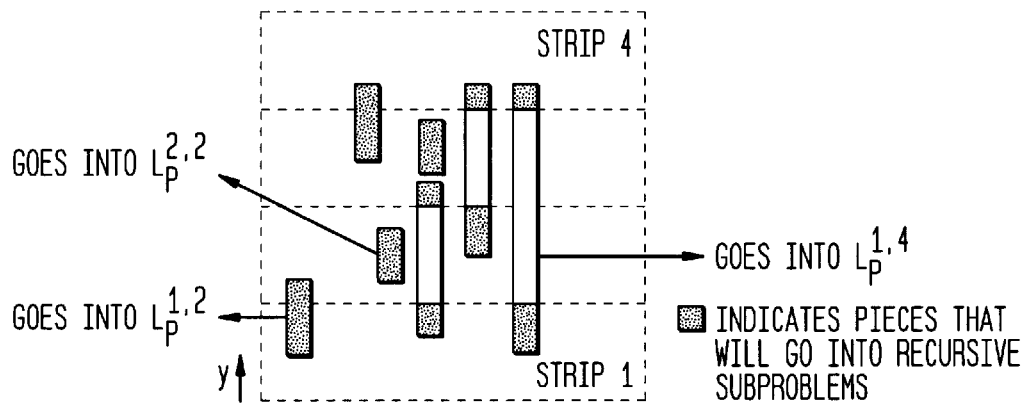
FIG. 5 is an illustration of the partitioning process in accordance with the two-dimensional join methodology of the present invention.

Specifically, a user requests a database query for a join operation on sets P and Q (step 305). Sets P and Q are sorted in order of increasing lower boundaries in the x-axis into a single list L (step 310). The method of the present invention partitions the two-dimensional space into k strips along the y-axis, such that at most 2N/k rectangles start or end in any strip (step 320). For example, FIG. 5 illustrates an example of the partitioning used by the two-dimensional join method. Here, k=4, and each strip has no more than 3 rectangles that will be handled further down in the recursion. (Such rectangles are shown as shaded boxes.) The I/O-lists that rectangles will get added into are shown for some of the rectangles. The details of the latter processes are explained below.

The method then classifies each of the rectangles as large and small. A rectangle is called small if it is properly contained in a single strip, and large otherwise. Each large rectangle is partitioned into exactly three pieces: two end pieces in the first and last strip that the rectangle intersects with, and one center piece in between the end pieces (step 330). Given the above processing, the method then proceeds to compute all intersections between a center piece from P and a center piece from Q, and all intersections between a center piece from P and a small rectangle from Q or a center piece from Q and a small rectangle from P (step 340). In each strip, the method then recursively computes all intersections between an end piece or small rectangle from P and an end piece or small rectangle from Q (step 350).

The boundaries of the strips can be computed by sorting the y-coordinates of the end points, and then scanning the sorted list. In this case, care should be taken to split the sorted list into several smaller sorted lists in order to avoid having to sort again in each level of the recursion. The same is applicable to list L. In one embodiment, sampling is used to establish the strip boundaries. The recursion terminates when the entire subproblem fits into memory, at which point, commonly known internal methods based on priority search trees can be used to solve the problem. Note that the total number of input rectangles at each level of the recursion is at most 2N, since every interval that is partitioned can result in at most two end pieces.

The implementation of step 340 could be realized in the following manner. Note that the problem of computing the intersections involving center pieces in step 340 is quite similar to the interval join problem in the previous section. In particular, any center piece can only end at strip boundaries. This means that a small rectangle r contained in strip i intersects a center piece s going through strip i if and only if the intervals ($r^\circ$ $min^x$, $r_{max}^x$) and ($s_{min}^x$, $s_{max}^x$) intersect. Thus, the desired intersections can be computed by running k interval joins along the x-axis, one for each strip.

However, this direct solution would not guarantee the claimed bound, since it would require that a center piece that spans a large number of strips participates in each of the corresponding interval joins. In a preferred embodiment, this problem is solved by performing all these interval joins in a single scan of the rectangle list L, where instead of using two I/O-lists $L_P$ and $L_Q$, a total of (k+2)(k+3) I/O-lists $L_P^{i,j}$ and $L_Q^{i,j}$ is maintained with $0 \leq i \leq j \leq k+1$. The preferred method for step 340 is described with respect to FIGS. 4–5.

Figure 4:
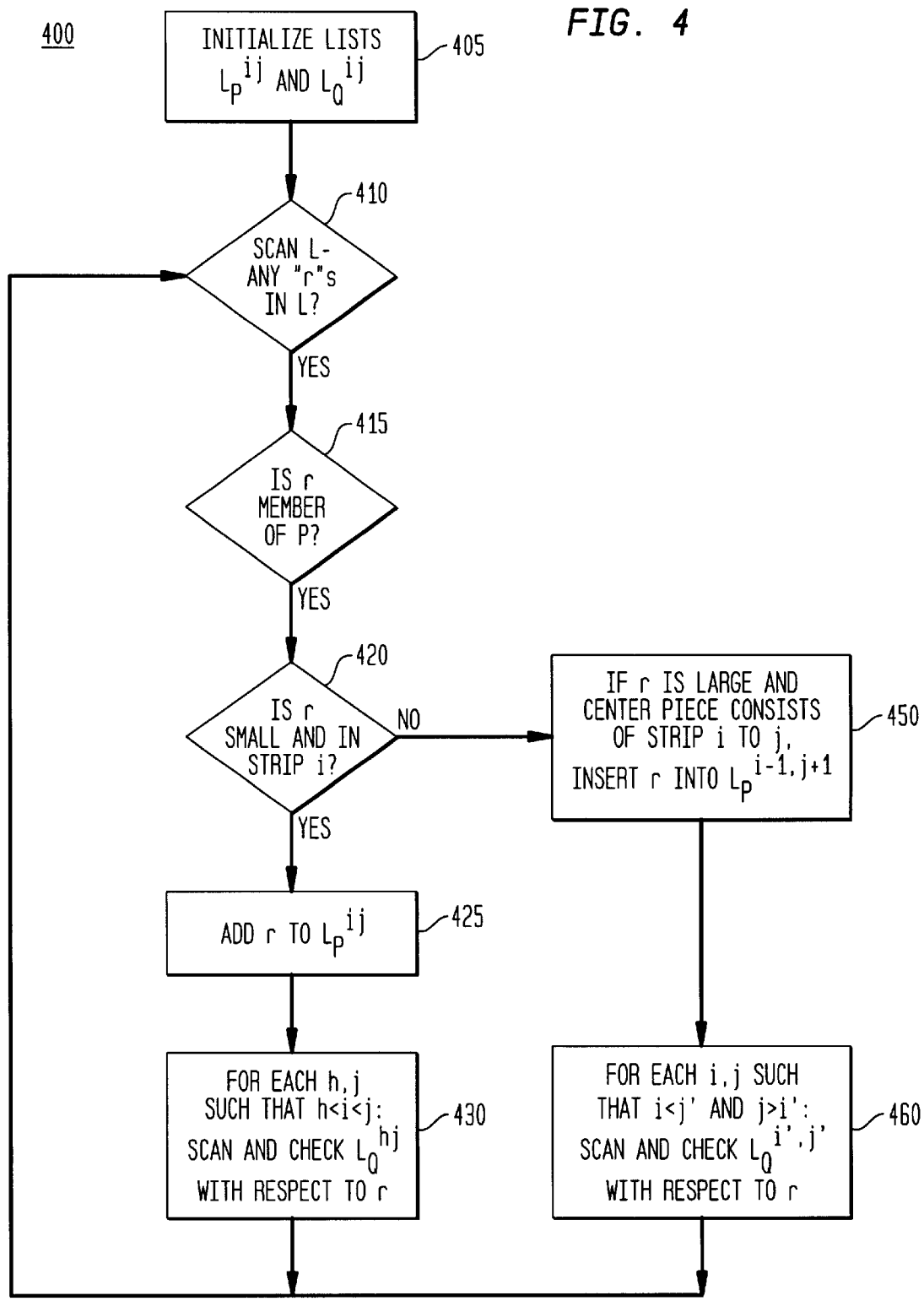
FIG. 4 is a more detailed functional flowchart of a two-dimensional join processed in accordance with the method of the present invention.

Specifically, with reference to FIG. 4, the methodology maintains (k+2)(k+3) I/O-lists $L_P^{i,j}$ and $L_Q^{i,j}$ (step 405). Similar to the interval join method, the method determines, for every interval r in L (step 410), if r is a member of set P (step 415) or a member of set Q. For sake of clarity, the steps described below are explained with reference to set P, but are also applicable to set Q, with the roles of P and Q reversed. For each interval r, the following operations are performed.

If r is a member of set P, it is then determined if r is a small or large rectangle (step 420). If r is small and contained within strip i, then r is added to I/O-list $L_P^{i,i}$ (step 425). Every I/O-list $L_Q^{h,j}$, where h<i<j, is then scanned to determine for each interval q whether q intersects r (step 430). If there is such an intersection, then the intersection is outputted and interval q is kept in I/O-list $L_Q^{h,j}$. If an intersection is not found, then interval q is deleted from I/O-list $L_Q^{h,j}$. The latter two steps correspond to step 295 and 296 in FIG. 2A.

Figure 2A:
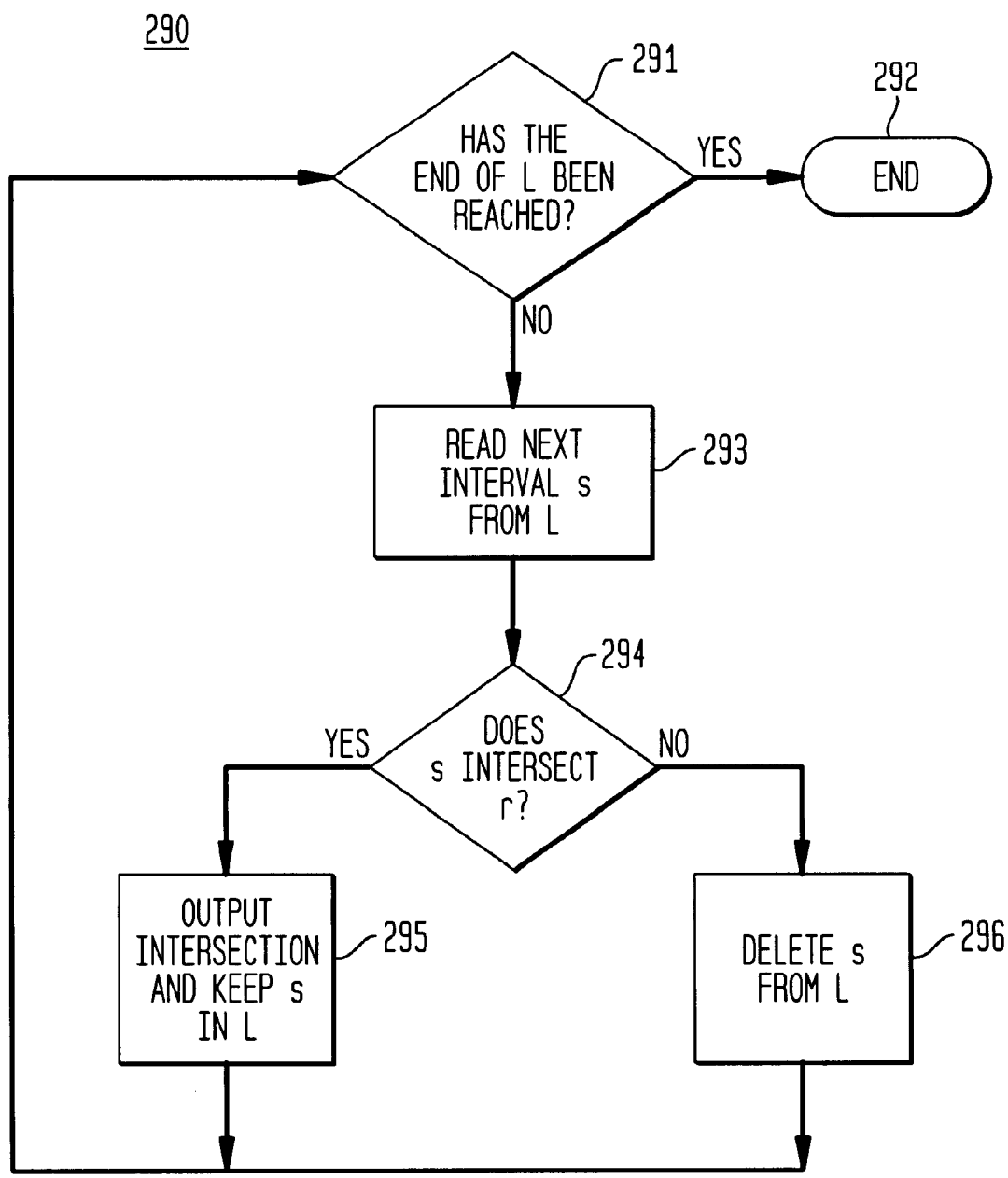
FIG. 2A is a more detailed functional flowchart of a block in the one-dimensional join process shown in FIG. 2.

If r is large and its center piece consists of strips i to j, then it is inserted into I/O-list $L_P^{i-1,j+1}$ (step 450). Every I/O-list $L_Q^{i',j'}$, with i'<j and j'>i, is scanned to determine for each interval q in $L_Q^{i',j'}$ whether q intersects r (step 460). If there is such an intersection, then the intersection is outputted and interval q is kept in I/O-list $L_Q^{i',j'}$. If an intersection is not found, then interval q is deleted from I/O-list $L_Q^{i',j'}$ (This is shown in FIG. 2A). An example of the above is shown with respect to FIG. 5, where k=4 and each strip has no more than 3 rectangles that will be handled in recursive step 650 of FIG. 6 (as indicated by the shaded boxes). In accordance with the methodology, the small rectangle in strip 2 would be inserted into I/O-list $L_P^{2,2}$, the large rectangle spanning strips 1 and 2 would be inserted into I/O-list $L_P^{1,2}$ and the large rectangle spanning strips 1–4 would be inserted into I/O-list $L_P^{1,4}$.

The methodology correctly outputs all intersections between rectangles in P and Q correctly and only once. Note that if a rectangle is large, then step 400 reports all the intersections between the large rectangle's center piece and all the other rectangles in the other set. To see this, classify all the (p,q)-pairs that intersect, and where p is large, into two cases: ($\alpha$) $q_{min}^x < p_{min}^x$ and ($\beta$) $p_{min}^x < q_{max}^x$. (Equalities are easily handled using a tie-breaking strategy.) Steps 420–430 clearly handle all intersections from case ($\alpha$) because the currently "active" intervals are stored in the various I/O-lists and steps 450–460 intersect p with all of the lists that intersect with its center piece. The case where the interval q instead of p is large follows from symmetry and similarly handles case ($\beta$).

In order to not report an intersection multiple times at different levels of recursion, the method keeps track of intervals whose endpoints extend beyond the "current boundaries" of the recursion and stores them in separate distinguished I/O-lists. (There are at most 2k of these lists.) By never comparing elements from distinguished lists of P and Q, the method avoids reporting duplicates.

Figure 3:
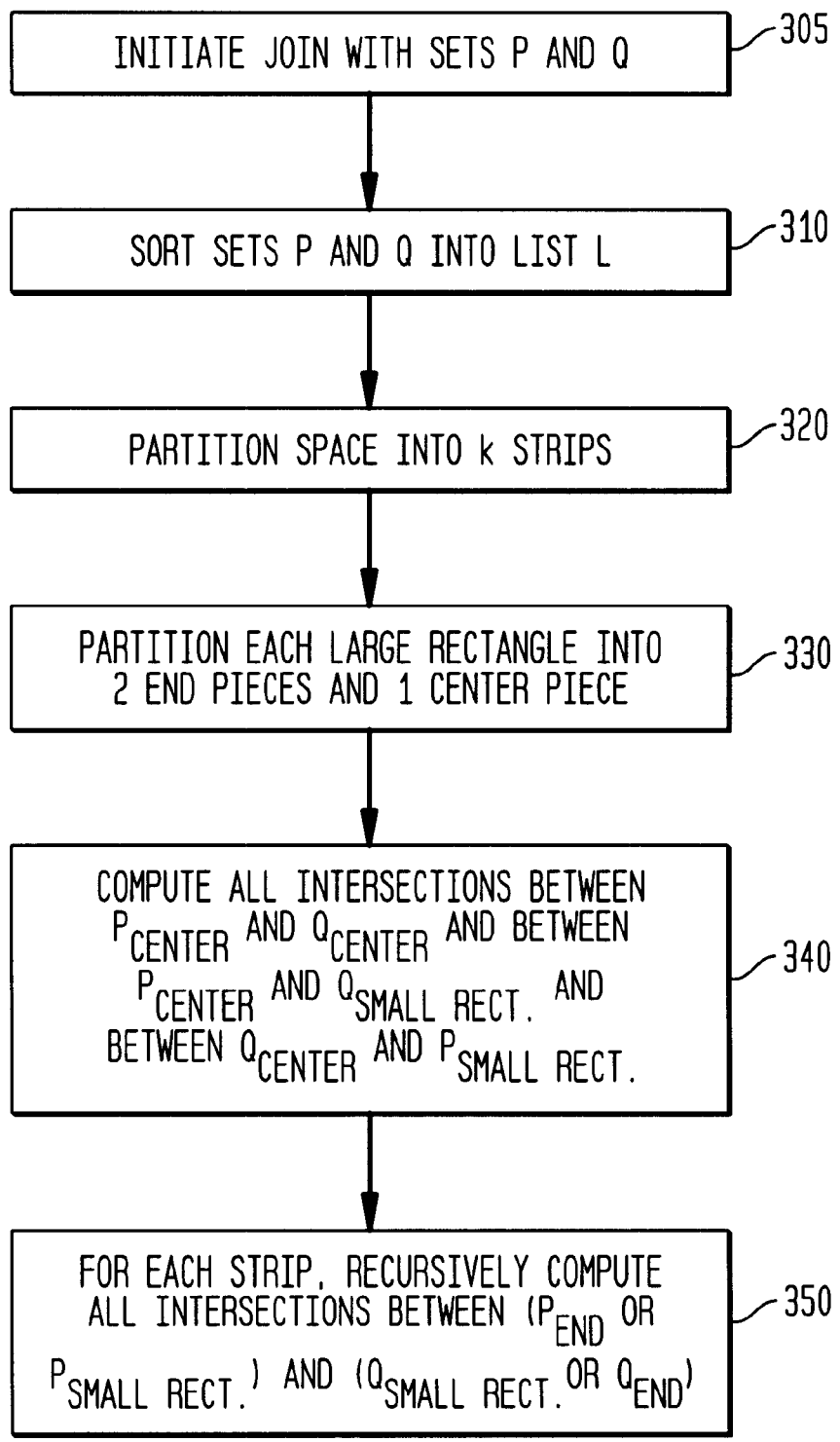
FIG. 3 is a functional flowchart of a two-dimensional join processed in accordance with the method of the present invention.

To maintain a bound on the running time, note that as in the interval join method from the previous section, each small interval and each center piece is inserted only once and only into a single list. Also, an element in a list produces an intersection every time it is scanned, except for the last time, when it is deleted. This analysis contemplates that each I/O-list has exclusive use of at least one block of main memory, so that the partitioning factor k of the distribution sweep should be chosen to be at most $\sqrt{m}$ (and probably slightly smaller in practice). Thus, the cost of step 340 in FIG. 3 is linear in the input size and the number of intersections produced in this step, and the total cost over $\log_k n = O(\log_m n)$ levels of recursion is $O(n \log_m n+t)$. Note that the sublists of L created by step 340 for use in the recursive computations inside the strips are already in sorted order. Consequently, given a list of rectangles from P and Q sorted by their lower boundaries in one axis, the rectangle join method generates all intersections between rectangles from P and Q using $O(n \log_m n+t)$ I/O operations.

As in the case of the interval join method, efficiency can be improved by reading entire blocks of rectangles before scanning the lists. As already mentioned, one of the more practical ways of computing the boundaries of the strips would be based on sampling, where the sample could be drawn during the initial sort step.

4. The Three-Dimensional and d-Dimensional Cases

In general, the d-dimensional join method of the invention uses distribution sweeping recursively across d−1 of the d-dimensions, resulting in a running time of $O(n \log_m^{(d-1)} n+t)$. Essentially, the methodology reduces the d-dimensional join to a problem that can be seen as a generalization of a (d−1)-dimensional join, plus a number of smaller d-dimensional joins. The three-dimensional method is explained, followed by the d-dimensional method.

4.1 The Three-dimensional Method

For the three-dimensional join problem, there are two sets $P=\{p_i | i \in [N_1]\}$ and $Q=\{q_i | i \in [N_2]\}$ of rectangles, and each rectangle r$\in$P or r$\in$Q is defined by the boundaries $r_{min}^x$, $r_{max}^x$, $r_{min}^y$, $r_{max}^y$, $r_{min}^z$, and $r_{max}^z$. Again assume that at the beginning of the process, P and Q have already been sorted into one list L of rectangles according to their lower boundaries in the x-axis, which can be done in $O(n \log_m n)$ I/O operations. Note that the high-level structure of the three-dimensional method, as shown in FIG. 6, is similar to that of the two-dimensional method.

Figure 7A:
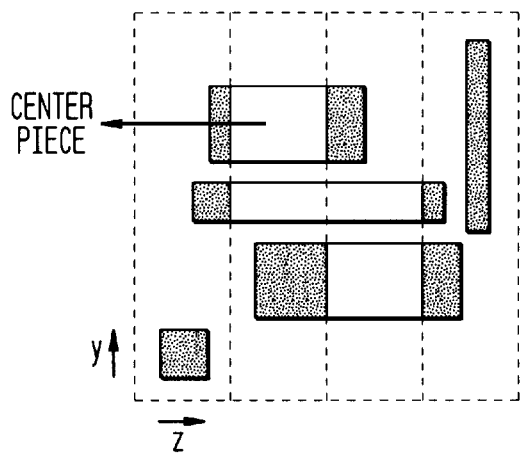
FIGS. 7(a) and 7(b) are illustrations of the partitioning process in accordance with the three-dimensional join methodology of the present invention.
Figure 6:
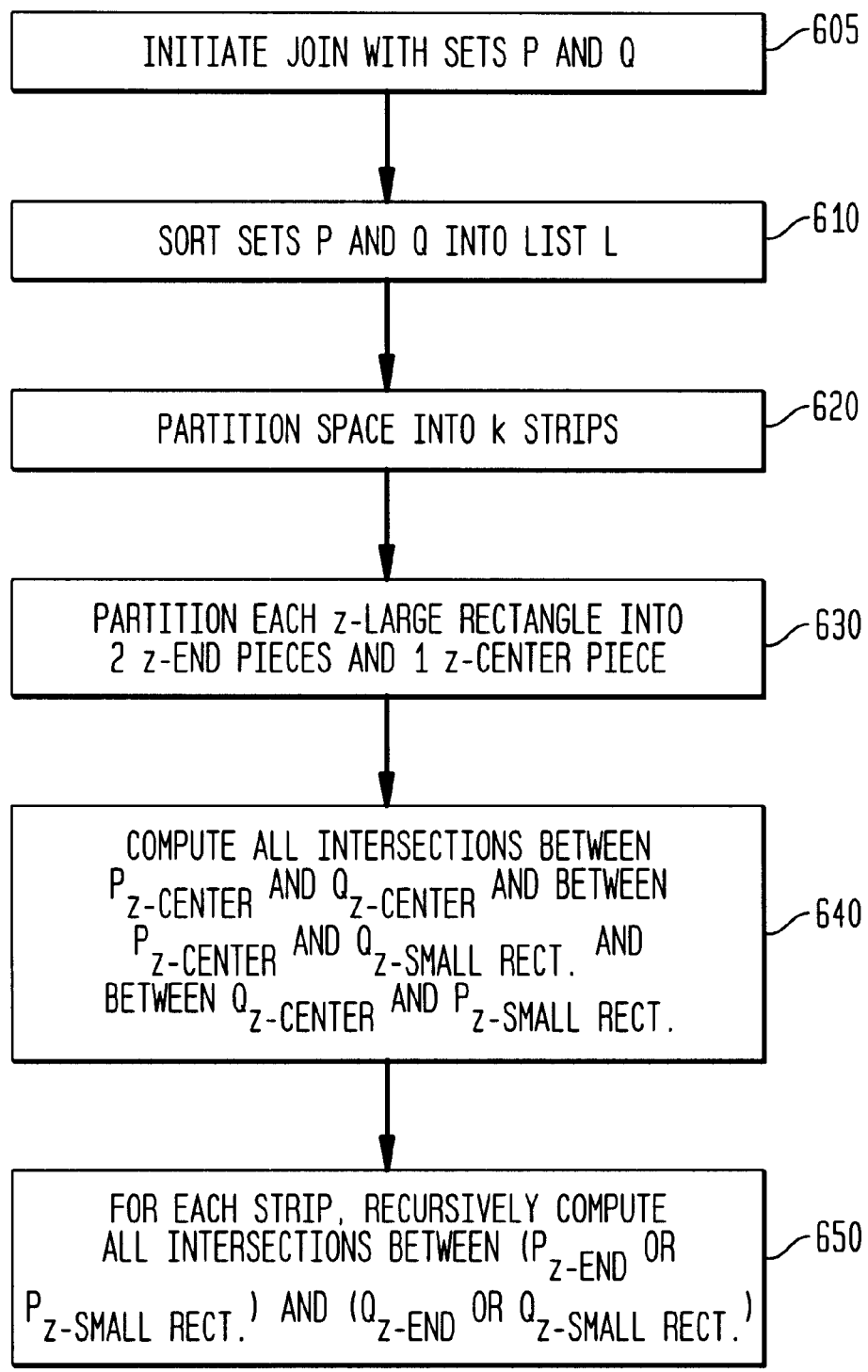
FIG. 6 is a functional flowchart of a three-dimensional join processed in accordance with the method of the present invention.

Specifically, with reference to FIG. 6, a user requests a database query for a join operation on sets P and Q (step 605). Sets P and Q are sorted in order of increasing lower boundaries in the x-axis into a single list L (step 610). The method partitions the three-dimensional space into k strips (noting that the strips are really slabs when referring to three dimensional space) along the z-axis, such that at most 2N/k rectangles start or end in any strip (step 620). For example, FIG. 7(a) illustrates an example of the partitioning used by the three-dimensional join method, where the observer is looking along the x-axis.

The method then classifies each of the rectangles as z-large and z-small. A rectangle is called z-small if it is properly contained in a single strip, and z-large otherwise. Each z-large rectangle is partitioned into exactly three pieces: two z-end pieces in the first and last strip that the rectangle intersects with, and one z-center piece in between the z-end pieces (step 630). Refer again to FIG. 7(a). Given the above processing, the method then proceeds to compute all intersections between a z-center piece from P and a z-center piece from Q, and all intersections between a z-center piece from P and a z-small rectangle from Q or a z-center piece from Q and a z-small rectangle from P (step 640). In each strip, the method then recursively computes all intersections between a z-end piece or z-small rectangle from P and a z-end piece or z-small rectangle from Q (step 650).

As shown above, step 620 can be solved in the same way as in the two-dimensional method. The recursion in step 650 terminates when the entire subproblem fits into memory, at which point, commonly known internal memory methods can be used which run in time $O(N \log_2^{(d-1)} N+t)$ (See H. Edelsbrunner & M. H. Overmars, "Batched Dynamic Solutions to Decomposable Searching Problems," J. Algorithms 6 (1985), 512–542.). The total number of input rectangles at each level of the recursion is at most 2N.

Figure 7B:
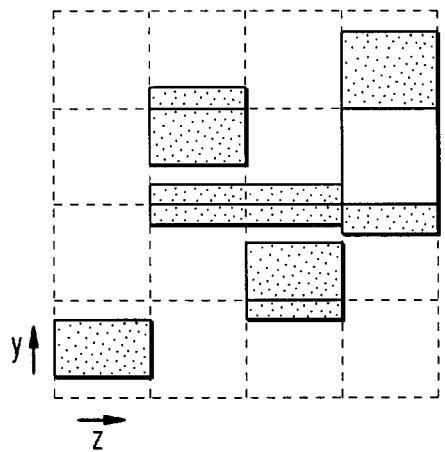

Before describing the implementation of step 640, consider what the input data for this phase of the method looks like. Note that the input consists of two types of rectangles: center pieces, which can only begin and end at the strip boundaries computed in step 620, and z-small rectangles, which can begin and end anywhere within a single strip. Note that step 640 does not have to determine the intersections between any two z-small rectangle since it is done in the recursion step. Therefore, it can be assumed that each z-small rectangle begins and ends at the boundaries of the strip it is contained in. Thus, the remaining problem can be seen as being "two-and-a-half-dimensional" in the sense that the objects can start and end at arbitrary coordinates in the x and y-axes, but can only start and end at a bounded number of k+1 coordinates in the z-axis. This is illustrated in FIG. 7(b).

The problem of FIG. 7(b) can be solved by a generalization of the two-dimensional method, as follows. As in the two-dimensional case, the method partitions into strips along the y-axis, and identifies y-small and y-large rectangles, and y-end and y-center pieces. For each strip, a recursion subproblem is solved, as in step 350 of the rectangle join method of FIG. 3. Thus, in step 640 of the three-dimensional method, the method matches all of the y-center pieces with each other and with all y-small pieces. This is achieved by scanning through a new sorted list L' consisting of the z-center pieces and z-small rectangles sorted by $r_{min}^x$, and by inserting each rectangle into one I/O-list and probing it against some of the other I/O-lists.

However, the method now maintains $\frac{1}{2}(k+2)^2(k+3)^2$ I/O-lists compared with only $(k+2)(k+3)$ lists in the two-dimensional method. More precisely, each list in the two-dimensional method can be regarded as being split into $(k+2)(k+3)$ sub-lists (implemented as separate I/O-lists). When a y-small rectangle or a y-center piece is encountered during the scan of L', the method first determines the list it would belong to in the two-dimensional method by considering the y-boundaries, and then determines the correct sub-list by looking at the z-boundaries. After inserting the element, it is matched against all the other lists whose elements have to overlap with it in the y and z-axes.

As in the previous section, each matching attempt either produces an intersection, or results in the removal of an element from some list. By choosing $k=\theta(m^{1/4})$, each I/O-list is guaranteed to have at least one block in memory, and thus the total running time for step 640 of the three-dimensional method is $(n \log_m n+t)$. Solving the resulting recurrence problem, the three dimensional join method generates all intersections between rectangles from P and Q using $O(n\log_m^2 n+t)$ I/O operations.

4.2 Multi-Dimensional Joins

The d-dimensional method is a generalization of the approach described for the three-dimensional case. In particular, the method for d dimensions will split the problem into smaller d-dimensional problems in each strip, plus one "(d−1)-and-a-half-dimensional" problem (with d−1 continuous and one discrete dimension) that can be solved by a modification of the (d−1)-dimensional method that uses a factor of $\theta(k^2)$ more lists. A d-and-a-half dimensional join is a join in d dimensions where, in one particular or distinguished dimension, all coordinates are drawn from a small finite set of values. This extra recurrence in step 640 of the three-dimensional method terminates when the problem has been partitioned along d−1 dimensions, at which point, d−1 discrete dimensions are represented by a total of $\theta(k^{2(d-1)})$ lists. Choosing $k=\theta(m^{1/(2(d-1))})$ and solving the recurrence, an I/O bound of $O(n\log_m^{(d-1)} n+t)$ is obtained. Note that d is assumed to be constant for sake of clarity. Similar to the previous methods, the d-dimensional method also uses linear space.

Conclusion

Described herein are I/O-efficient methods for performing intersection-based joins between two sets of rectangles in d dimensions. The methods for one and two dimensions are I/O optimal. The methods for higher dimensions are within logarithmic factors of the known lower bounds, and compare well with the best main memory algorithms known for this problem.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A method for performing a d-dimensional join between a first set and a second set of hyper-rectangles, at least one of said first set and said second set being stored in secondary memory, comprising the steps of:

dividing the d-dimensional join into k d-dimensional join strips and a (d−1)-and-a-half dimensional join;

classifying hyper-rectangles within said strips as large if they are contained in more than a single strip and small if they are contained within said single strip;

partitioning each large hyper-rectangle into one center piece and two end pieces;

recursively computing intersections between a first type from said first set and a second type from said second set, wherein each of said first type and said second type is one selected from a group consisting of said end pieces and said small hyper-rectangles;

computing intersections between center pieces from said first set and second set and with said small hyper-rectangles from said first set and said second set by partitioning said (d−1)-and-a-half dimensional join along d−1 dimensions and by processing through said steps of dividing, classifying, partitioning and recursively computing intersections for each of said d−2 dimensions; and reporting to the secondary memory all computed intersections.

2. The method of claim 1, further including the steps of:

creating a first plurality of lists for containing hyper-rectangles from said first set and a second plurality of list for containing hyper-rectangles from said second set; and populating one of said first plurality of lists and said second plurality of lists when a selected hyper-rectangle is a member of one of said first set and said second set and deleting all hyper-rectangles from a remaining one of said first set and said second set not intersecting said selected hyper-rectangle.

3. The method of claim 2, wherein said a single block B of each of said first plurality of lists and said second plurality of lists is kept in the main memory.

4. The method of claim 2, wherein said selected hyper-rectangle is added to a corresponding single block B after determining set membership and writing out said corresponding single block B when said single block B is full.

5. The method of claim 2, wherein non-intersections are determined by reading an entire list, scanning for intersections, deleting non-intersecting hyper-rectangles and writing out to the secondary memory all retained hyper-rectangles.

6. The method of claim 1, wherein all intersections are reported only once.

7. The method of claim 1, further including the steps of:

sorting said first set and said second set by their lower boundaries in a selected axis; and outputting a combined list of hyper-rectangles.

8. The method of claim 7, wherein said step of computing intersections further includes the steps of:

sorting given hyper-rectangles by their lower boundaries in a selected axis to form a single list;

scanning said single list in order of increasing lower boundaries with respect to a given axis for every hyper-rectangle contained therein;

determining a set membership for a selected hyper-rectangle; determining whether said selected hyper-rectangle is contained within a single strip;

inserting said selected hyper-rectangle into one of a plurality of lists corresponding to said set membership;

deleting all hyper-rectangles not contained in at least one list of a plurality of lists corresponding to a non-set membership; and writing out to the secondary memory said selected hyper-rectangle and writing out to the secondary memory appropriate end pieces of said selected hyper-rectangle when said selected hyper-rectangle is contained within at least two strips.

9. An apparatus for performing a d-dimensional join of a first set and a second set of hyper-rectangles, comprising:

a secondary memory for storing at least one of said first set and said second set;

a processor having a main memory, said processor coupled to said secondary memory;

said processor being operable to divide the d-dimensional join into k d-dimensional join strips and a (d−1)-and-a-half dimensional join;

said processor being further operable to classify hyper-rectangles within said strips as large if they are contained within more than a single strip and small if they are contained within said single strip;

said processor being further operable to partition each large hyper-rectangle into one center piece and two end pieces;

said processor being further operable to recursively compute intersections between a first type from said first set and a second type from said second set, wherein said first type and said second type is one selected from a group consisting of said end pieces and said small hyper-rectangles; and said processor being further operable to compute intersections between center pieces from said first set and second set and with small hyper-rectangles from said first set and said second set by partitioning said (d−1)-and-a-half dimensional join along d−1 dimensions and by dividing, classifying, partitioning and recursively computing intersections for each of said d−2 dimensions.

10. The apparatus of claim 9, wherein:

said processor is further operable to create a first plurality of lists for containing hyper-rectangles from said first set and a second plurality of list for containing hyper-rectangles from said second set; and said processor is further operable to populate one of said first plurality of lists and said second plurality of lists when a selected hyper-rectangle is a member of one of said first set and said second set and deleting all hyper-rectangles from a remaining one of said first set and said second set not intersecting said selected hyper-rectangle.

11. The apparatus of claim 10, wherein a single block B of each of said first plurality of lists and said second plurality of lists is kept in said main memory.

12. The apparatus of claim 10, wherein said selected hyper-rectangle is added to a corresponding single block B after determining set membership and writing out said corresponding single block B to said secondary memory when said single block B is full.

13. The apparatus of claim 10, wherein said processor is further operable to determine non-intersections by reading an entire list, scanning for intersections, deleting non-intersecting hyper-rectangles and writing out to said secondary memory all retained hyper-rectangles.

14. The apparatus of claim 9, wherein said processor reports all intersections only once.

15. The apparatus of claim 9, wherein said processor is further operable to output a sorted combined list from said first set and said second set by the lower boundaries of hyper-rectangles contained therein.

16. The apparatus of claim 15, wherein:

said processor is further operable to sort given hyper-rectangles by their lower boundaries in a selected axis to form a single list;

said processor is further operable to scan said single list in order of increasing lower boundaries with respect to a given axis for every hyper-rectangle contained therein;

said processor is further operable to determine a set membership for a selected hyper-rectangle;

said processor is further operable to determine whether said selected hyper-rectangle is contained within a single strip;

said processor is further operable to insert said selected hyper-rectangle into one of a plurality of lists corresponding to said set membership;

said processor is further operable to delete all hyper-rectangles not contained in at least one list of a plurality of lists corresponding to a non-set membership; and said processor is further operable to write out to said secondary memory said selected hyper-rectangle and write out to said secondary memory appropriate end pieces of said selected hyper-rectangle when said selected hyper-rectangle is contained within at least two strips.

17. A method for performing a two-dimensional join of a first set and a second set of rectangles, one of said first set and said second set being stored in secondary memory, comprising the steps of:

partitioning the two-dimensional join along a selected axis into k two dimensional join strips;

classifying rectangles within said strips as large if they are contained within more than a single strip and small if they are contained within said single strip;

partitioning each large rectangle into one center piece and two end pieces;

computing intersections between center pieces from said first set and second set and with said small rectangles from said first set and said second set;

recursively computing intersections between a first type from said first set and a second type from said second set, wherein said first type and said second type is one selected from a group consisting of said end pieces and said small rectangles; and reporting to the secondary memory all computed intersections.

18. The method of claim 17, further including the steps of:

creating a first plurality of lists for containing rectangles from said first set and a second plurality of list for containing rectangles from said second set; and populating one of said first plurality of lists and said second plurality of lists when a selected rectangle is a member of one of said first set and said second set and deleting all rectangles from a remaining one of said first set and said second set not intersecting said selected rectangle.

19. The method of claim 18, wherein a single block B of each of said first plurality of lists and said second plurality of lists is kept in the main memory.

20. The method of claim 17, wherein all intersections are reported only once.

21. The method of claim 17, further including the step of sorting said first set and said second set by their lower boundaries in a given axis to form a single list of rectangles.

22. The method of claim 21, wherein said step of computing intersections further includes the steps of:

scanning said single list in order of increasing lower boundaries with respect to a given axis for every interval contained therein;

determining a set membership for a selected interval;

determining whether said selected interval is contained within a single strip;

inserting said selected interval into one of a plurality of lists corresponding to said set membership;

deleting all intervals not contained in at least one list of a plurality of lists corresponding to a non-set membership; and writing out to the secondary memory said selected interval and writing out to the secondary memory appropriate end pieces of said selected interval when said selected interval is contained within at least two strips.

23. The method of claim 17, wherein said step of recursively computing further includes the step of tracking intervals whose end points extend beyond a current strip by storing them in a set of lists.

* * * * *